(12) United States Patent
Grobman

(10) Patent No.: US 7,539,986 B2
(45) Date of Patent: May 26, 2009

(54) METHOD FOR GUEST OPERATING SYSTEM INTEGRITY VALIDATION

(75) Inventor: Steven L. Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 861 days.

(21) Appl. No.: 10/881,830

(22) Filed: Jun. 30, 2004

(65) Prior Publication Data

US 2006/0005003 A1 Jan. 5, 2006

(51) Int. Cl.
*G06F 9/455* (2006.01)
*G06F 9/46* (2006.01)
*G06F 11/00* (2006.01)

(52) U.S. Cl. .................... 718/1; 718/100; 718/104; 718/105; 718/108; 714/7; 714/8; 714/21; 714/37; 714/39

(58) Field of Classification Search ............. 718/1–108; 709/102; 714/10, 20, 23, 2, 3, 7, 8, 15, 21, 714/37, 39, 42, 48, 49
See application file for complete search history.

(56) References Cited

U.S. PATENT DOCUMENTS

| 5,727,206 | A | * | 3/1998 | Fish et al. .................... 707/202 |
| 5,805,790 | A | * | 9/1998 | Nota et al. ..................... 714/10 |
| 6,247,139 | B1 | * | 6/2001 | Walker et al. .................. 714/2 |
| 6,253,224 | B1 | * | 6/2001 | Brice et al. .................... 718/1 |
| 6,564,228 | B1 | * | 5/2003 | O'Connor .................... 707/200 |
| 7,305,393 | B2 | * | 12/2007 | Seeger et al. ................... 707/9 |
| 2003/0037089 | A1 | * | 2/2003 | Cota-Robles et al. .......... 709/1 |
| 2004/0003323 | A1 | * | 1/2004 | Bennett et al. ................. 714/36 |
| 2005/0060702 | A1 | * | 3/2005 | Bennett et al. ................. 718/1 |
| 2005/0223220 | A1 | * | 10/2005 | Campbell et al. ........... 713/164 |

* cited by examiner

*Primary Examiner*—Van H Nguyen
*Assistant Examiner*—Abdullah Al Kawsar
(74) *Attorney, Agent, or Firm*—Blakely, Sokoloff, Taylor & Zafman LLP

(57) ABSTRACT

A method includes performing a file system integrity validation on a host machine having a hypervisor architecture when a file system of a second process is mounted on a file system of a first process. The file system integrity validation occurs independently of booting the host machine.

30 Claims, 5 Drawing Sheets

METHOD FOR GUEST OPERATING SYSTEM INTEGRITY VALIDATION

BACKGROUND

1. Field

The embodiments relate to guest operating system integrity validation, and more particularly to guest operating system integrity validation through a virtual machine monitor (VMM) hypervisor trap.

2. Description of the Related Art

Today's computers make use of various memory partitioning and the use of virtual machines (VM) to increase operability and performance. More specifically, some of the reasons for using VMs are as follows. VMs can be used to consolidate the workload of underused computers (e.g., servers) within a single host machine, thus saving hardware, maintenance and administration costs. VMs can run legacy software applications where the legacy software may not be capable of running on the new host machine or with a new operating system (OS). This makes the choice of upgrading OS software an easier for system administration personnel since a VM can run the legacy OS applications. VMs can be used for running isolated programs for security purposes. VMs can be used to run multiple OSs or different versions of the same OS on a single host computer. The illusion of a hardware configuration not included on the host machine can be served by a VM. VMs provide isolation for applications and can provide tools, such as debugging, performance monitoring, fault injection, etc.

Traditionally, a layer of software is used to provide a virtual "real" machine to multiple instances of VMs. This software layer is known as the virtual machine monitor (VMM) or hypervisor. The VMM creates a series of virtual environments that run on top of the hardware. Therefore, each VM appears as a separate, unshared collection of resources. A VMM can be used in different scenarios to provide virtualization or logical partitioning. A VMM can run by itself directly on the real hardware without the need of a host OS. A VMM can be hosted and run as an application on top of a host OS. In this scenario, the VMM uses the host OS application program interface (API). And, if the VM architecture is different from the host machine, instruction set emulation would be required.

There are two types of VMM architectures typically used. The first type runs directly on the host machines hardware and typically has good performance. FIG. 1 illustrates this type of VMM architecture. The second type of VMM architecture uses the existing host OS abstractions to implement services, and generally has poorer performance. FIG. 2 illustrates this type of VMM architecture.

A VMM can be used for manageability and can read a host's file system prior to the system being booted. The problem with this is that systems today have continuous states of operation (e.g., suspend, hibernate, etc.) as compared to a power off.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

The embodiments discussed herein generally relate to a method for guest operating system integrity validation. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Figure 1:
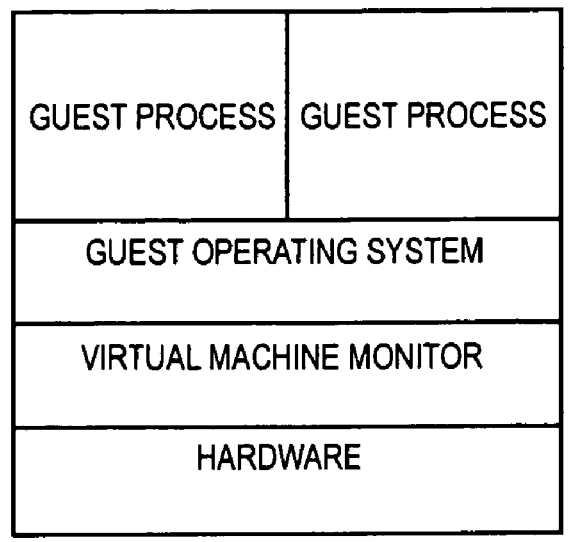
FIG. 1 illustrates a virtual machine monitor (VMM) architecture where the VMM runs directly on a host machine's hardware.
Figure 2:
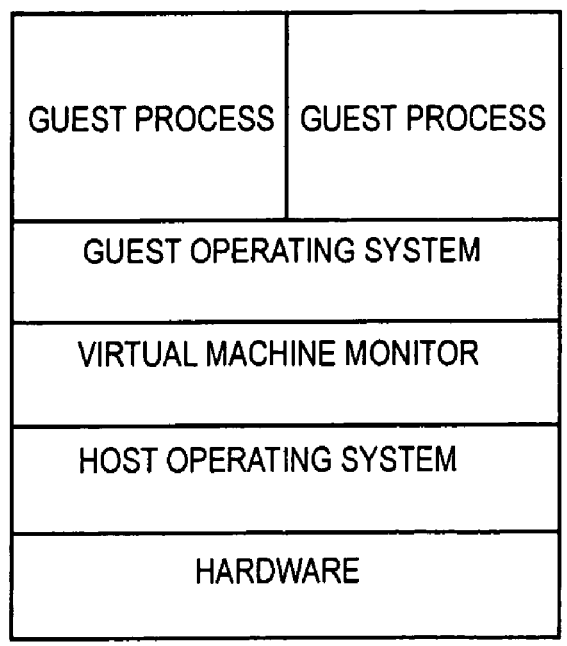
FIG. 2 illustrates a VMM architecture that uses existing host OS abstractions to implement services.
Figure 3:
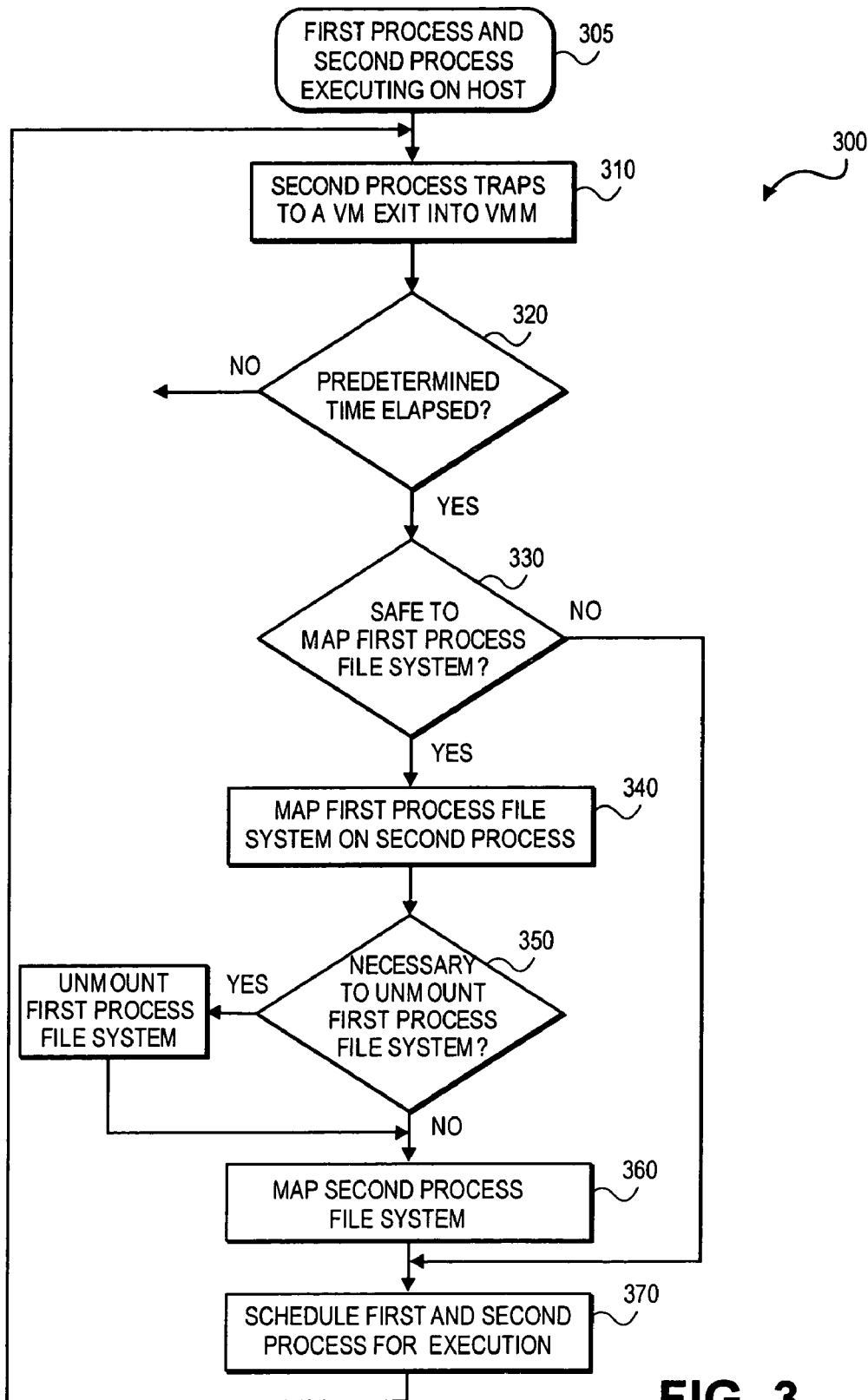
FIG. 3 illustrates a block diagram of a process for one embodiment.

FIG. 3 illustrates a block diagram of a process of an embodiment where a guest virtual machine (VM) can safely mount a read-only file system for a short period of time on another active guest VM live file system. Process 300 refers to the execution of a VM entity. In this embodiment, a first guest process (e.g., Guest A) and a second guest process (e.g., Guest B) are executing on a host machine (e.g., a host computer) that is partitioned, e.g., a capability partition, a management partition, a hypervisor running on top of the host hardware, etc. As illustrated in FIG. 3, process 300 begins with block 305 where a first process and a second process executing (i.e., running) on a host machine (e.g., host computer). In block 310, the second process traps to a process exit (i.e., VM exit) into a monitor process. In one embodiment, the monitor process is a virtual machine monitor (VMM). The trapping of the process exit for the second process can occur for any event that causes an exit to occur. Once the VM exit is trapped the second process is placed in a suspended state.

In block 310 a hypervisor (e.g., VMM) determines whether a predetermined amount of time has elapsed (e.g., one hour, eight hours, one day, etc.). In one embodiment, a clock is used to determine elapsed time and a process computes elapsed time from the last trap according to the present clock. In another embodiment, a counter s used to count up to a predetermined number (e.g., based on time). If the predetermined number has not been reached when a VM exit trap occurs for the second process, the counter increments. When the predetermined number has been met on a VM exit trap for the second process, the counter resets. In block 320, if the predetermined amount of time or number has not been met, process 300 continues with block 310, otherwise process 300 continues with block 330.

In block 330, the hypervisor determines whether it is safe to map the first processes file system. In one embodiment, the hypervisor determines if the second process has masked interrupt signals. If the second process does have masked interrupt signals, these can potentially be in the top half of the processes device driver and it would be unsafe for the second process's file system to be redirected. In another embodiment, it is safe to map the first processes file system if a write is not in process. In this embodiment, an operating system on the VM manages a memory address that indicates status of a write in progress or not. Therefore, in the case of finding masked interrupt signals, process 300 continues with block 370 where the first and second processes can be scheduled by the hypervisor for execution on the host machine, that is, safe to map the first process file system on the second processes file system.

If the hypervisor determines that the second process does not have masked interrupt signals, in block 340 the hypervisor remaps the first processes resource. In one embodiment, the hypervisor remaps the integrated device electronics (IDE) direct memory access (DMA) to the first process. In another embodiment the hypervisor unmounts the first process's file system and mounts it on the second process. In yet another embodiment, the hypervisor does not unmount the first process's file system if DMA is disabled or a DMA transfer is detected as not in the process of transferring (e.g., reading a Bus Master IDE active bit). Note that the resource can be system resources, such as input/output (I/O) access, memory access, etc.

In one embodiment the hypervisor will not schedule the second process for execution until the first process has an unmounted file system. In another embodiment, the hypervisor will schedule the second process for execution if the first process is mounted on the second process and if DMA is disabled or a DMA transfer is detected as not in the process of transferring. Therefore, block 350 determines whether it is necessary to unmount the first process file system. If the first processes file system is necessary to be unmounted, process 300 continues at block 355 where the first processes file system is unmounted. If it is determined that it is not necessary to unmount the first processes file system, process 300 continues with block 360.

When the first process has its file system unmounted, it is safe to have the hypervisor perform a read-only analysis of the file system for configuration information to perform an integrity validation. Therefore, process 300 allows for a more frequent validation than systems that do not perform file-system analysis unless the host is rebooted. Thus, allowing integrity validation/accommodation independently of a system reboot. This is important in case the file system configuration information has been changed before the host is rebooted. In this case, restrictions or hardware behavior modification can be applied for actions, such as connecting to an isolated virtual local area network (VLAN).

In block 360 the resource (e.g., the IDE-DMA) is remapped to the second process (i.e., after allowing for a validation based on file system content). After block 360, in block 370 the hypervisor schedules the first and second processes execution on the host machine and process 300 continues to check for the next VM exit trap of the second process at block 310.

Figure 4:
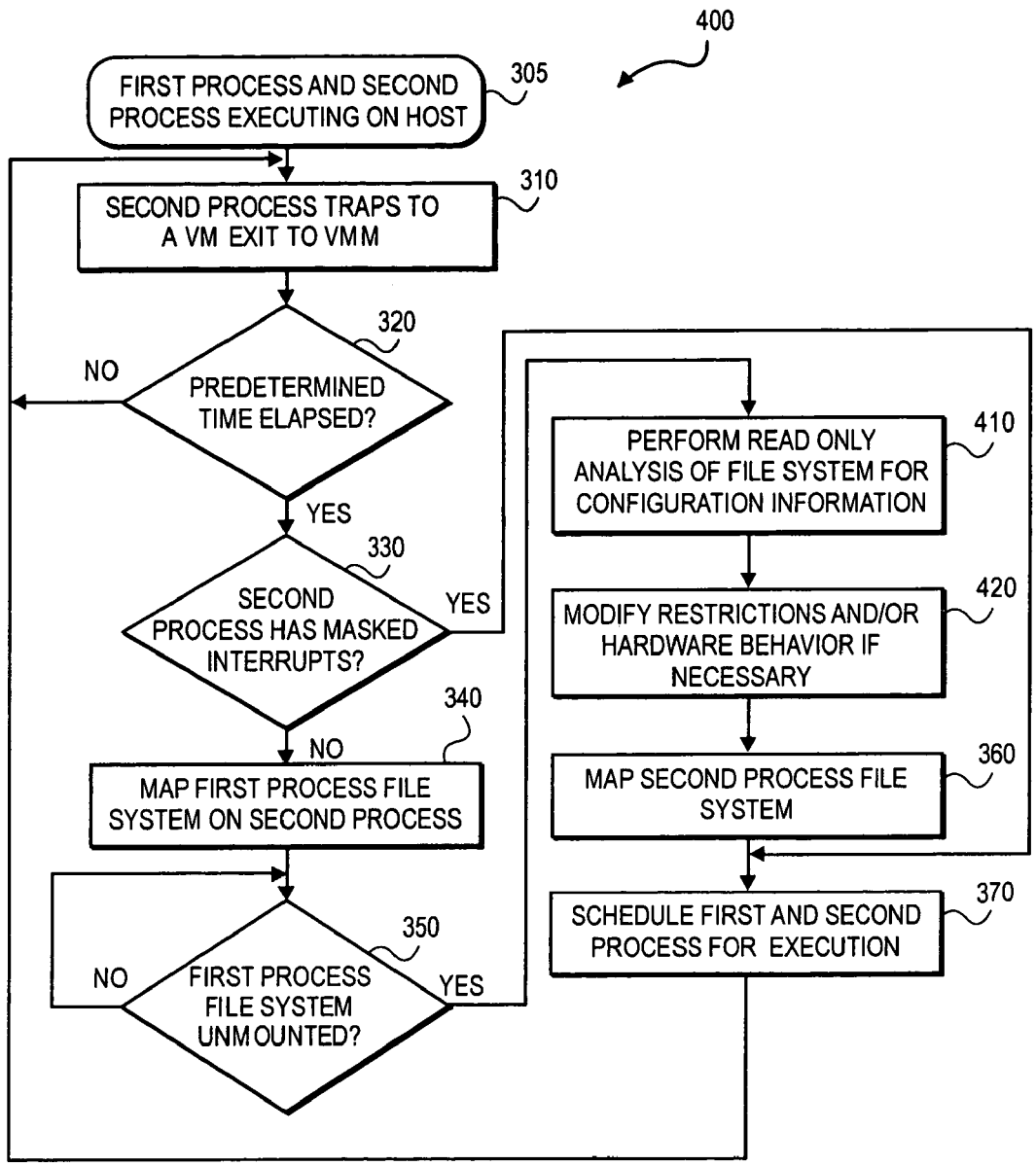
FIG. 4 illustrates a block diagram of a process for another embodiment.

FIG. 4 illustrates a block diagram of a process that performs a file system integrity validation independently of a reboot on a host machine having a hypervisor architecture and modifies restrictions and/or hardware behavior if necessary. Similar to process 300, process 400 includes the addition of blocks 410 and 420.

After process 400 completes block 350, process 400 performs a read-only analysis of the host's file system for configuration information in block 410 when it is safe to perform the read-only analysis in case any modifications have been made. This analysis occurs independently of the host rebooting. Therefore, the hypervisor uses the VM exit trap to start process 400, instead of waiting for a system reboot.

After block 410 is completed block 420 modifies host and VM restrictions and/or hardware behavior if necessary based on the analysis. Therefore, network connectivity access, privileges, etc. can be modified based on the analysis. Process 400 then continues as illustrated with process 300.

Figure 5:
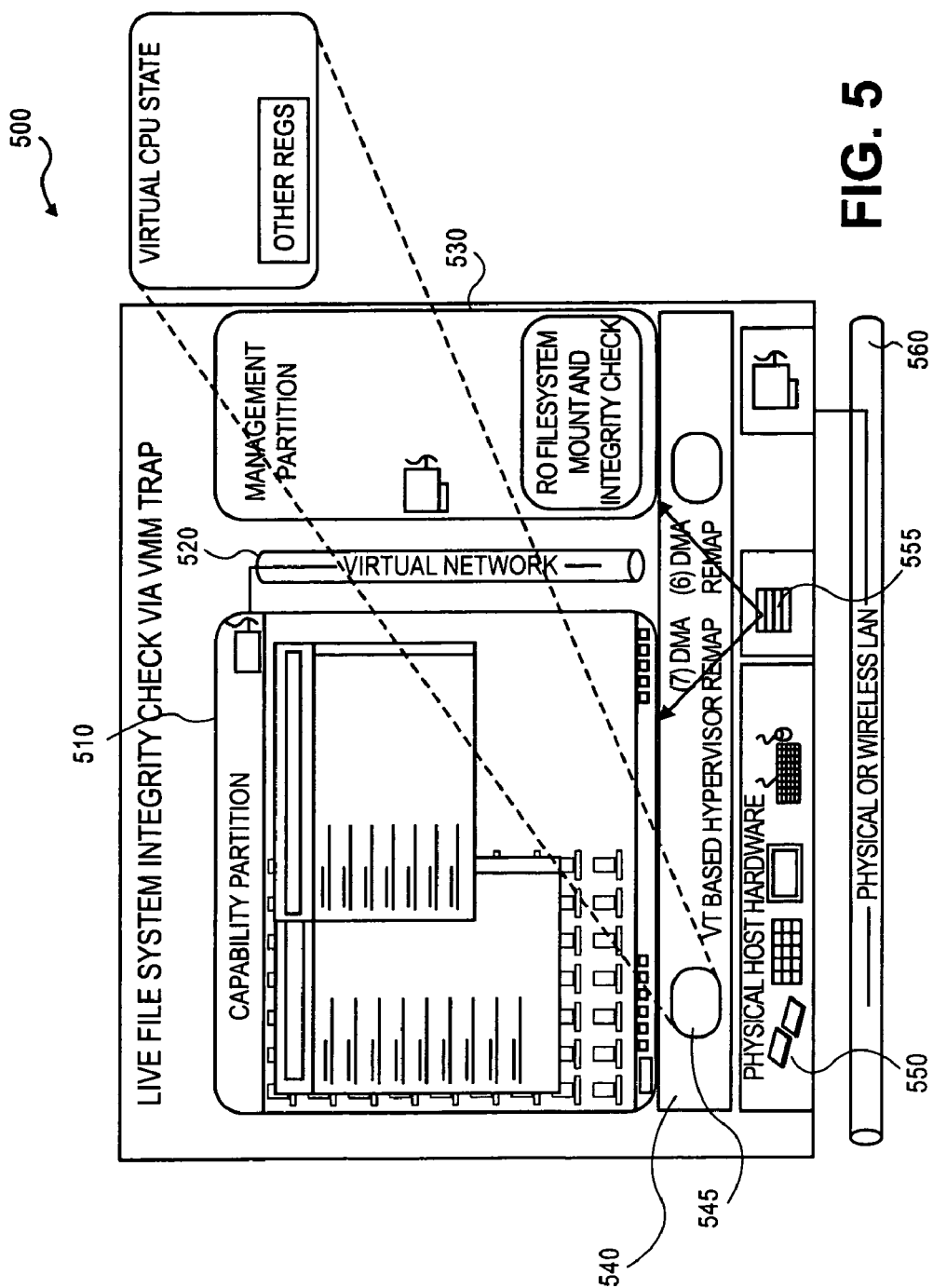
FIG. 5 illustrates a hypervisor architecture for an embodiment running the process illustrated in either FIG. 3 or FIG. 4.

FIG. 5 illustrates a block diagram of a hypervisor architecture used in the above embodiments. As illustrated, reference numeral 510 is a first guest process (i.e., VM) running on host hardware 550. In one embodiment, guest process 510 is partitioned as a capability partition (i.e., containing system capability information). In one embodiment second guest process 520 is partitioned as a management partition. Memory 555 access and I/O of host hardware 550 is virtually mapped to the guest processes running on host hardware 550. Virtual file systems for the guest processes use the host memory file system on memory 555. The guest processes and host can communicate externally to other networks and/or machines through physical or wireless LAN 560.

The VMs running on host hardware 550 can communicate with each other via virtual network 530. Hypervisor (VMM) 545 keeps track of guest processes VM states, such as virtual central processing unit (CPU) state, register states, etc. As asserted above, when a VM exit is trapped for a first guest process into the hypervisor (VMM) the hypervisor will begin a process (i.e., process 300/400).

Figure 6:
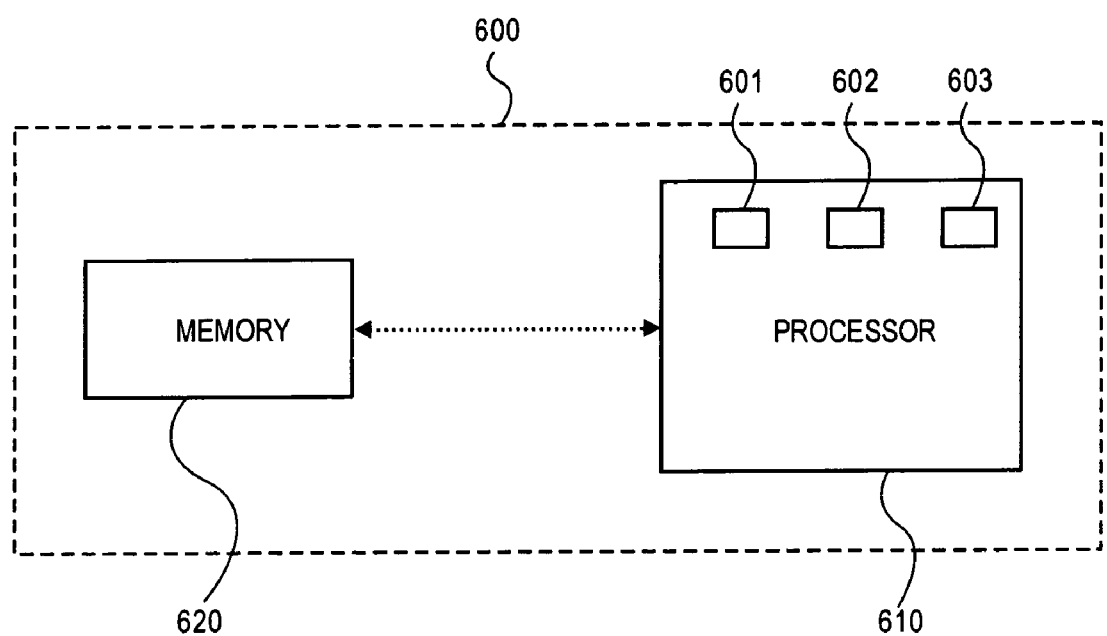
FIG. 6 illustrates a system including a process for one embodiment.

FIG. 6 illustrates an embodiment of a system. System 600 includes processor 610 connected to memory 620. In one embodiment memory 620 is a main memory, such as random-access memory (RAM), static random access memory (SRAM), dynamic random access memory (DRAM), synchronous DRAM (SDRAM), read-only memory (ROM), etc. In another embodiment, memory 620 is a cache memory. System 600 includes process 601 is in the form of an executable process running in processor 610 and communicating with memory 620. In this embodiment process 601 is process 300 as described above. In another embodiment, process 601 is process 400 as described above. In system 600, process 602 and 603 are guest processes running on system 600. System 600 can be combined with other known elements depending on the implementation. For example, if system 600 is used in a multiprocessor system, other known elements typical of multiprocessor systems would be coupled to system 600. System 600 can be used in a variety of implementations, such as personal computers (PCs), personal desk assistants (PDAs), notebook computers, servers, MRTEs, dynamic binary optimizers, dynamic binary translators, etc.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different VMs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
    performing a file system integrity validation on a host machine having a hypervisor architecture when a file system of a second process is mounted on a file system of a first process, wherein the file system integrity validation occurs independently of booting the host machine and includes
        determining if a time period has elapsed if the first process traps an event causing the first process to exit into a virtual machine monitor process;
        determining whether it is safe to remap access to the second process by a resource;
        scheduling the first process and the second process to run on the host machine if it is determined not safe to remap resource access to the second process, and
        if it is determined safe to remap resource access to the second process:
            remapping resource access to the second process,
            scheduling the first process to run on the host machine, and
            remapping resource access to the first process; and
    outputting a result of the file system integrity validation on the host machine.

2. The method of claim 1, the first process and the second process are guest processes to run on said host machine.

3. The method of claim 1, wherein the event causing an exit into the virtual machine monitor process places said first process in a suspended state.

4. The method of claim 1, said resource is one of input/output and memory.

5. A machine storage medium containing instructions that, when executed, cause a machine to:
    determine if a clock has reached a time if a first process is suspended;
    determine whether it is safe to remap access for a second process by a resource;
    schedule the first process and the second process to run on a host machine if it is determined not safe to remap resource access for the second process, and
    if it is determined safe to remap resource access for the second process:
        remap resource access for the second process,
        schedule the first process to run on the host machine, and
        remap resource access to the first process;
    analyze configuration information in a file system on the host machine when a file system of the second process is mounted on a file system of the first process,
    set restrictions for one of said first process, said second process, and said host machine, if necessary based on said configuration information, and
    restructure behavior for one of said first process, said second process and said host machine, if necessary based on said configuration information,
    wherein the setting of restrictions and restructuring behavior occur independently of booting the host machine.

6. The machine storage medium of claim 5, wherein the second process is suspended if the second process traps an event causing the second process to exit into a virtual machine monitor.

7. The machine storage medium of claim 5, said resource is one of input/output and memory.

8. The machine storage medium of claim 7, wherein it is determined safe to remap resource access for the second process if the first process did not generate masked interrupt signals.

9. A system comprising:
    a device having a processor coupled to a memory, said device having a hypervisor architecture;
    a first process and a second process both to communicate with said memory; and
    a third process to perform a file system integrity validation on said device when a file system of said second process is mounted on a file system of said first process, wherein the file system integrity validation occurs independently of booting the device and wherein said third process:
    determines if a time period has elapsed if the first process traps an event causing the first process to exit into the third process;
    determines whether it is safe to remap access to the second process by a resource;
    schedules the first process and the second process to run on the device if it is determined not safe to remap resource access to the second process, and
    if it is determined safe to remap resource access to the second process:
        remap resource access to the second process,
        schedule the first process to run on the device, and
        remap resource access to the first process.

10. The system of claim 9, the first process and the second process are guest processes to run on said device.

11. The system of claim 9, said resource is one of input/output and memory.

12. The system of claim 11, wherein it is safe to remap resource access to the second process when the first process did not generate masked interrupt signals.

13. A method comprising:
    executing a first process and a second process on a host machine;
    detecting that a predetermined amount of time has elapsed after the second process traps an event that causes an exit of the second process into a monitor process;
    determining whether one or more interrupts of the second process are masked;
    scheduling the first process and the second process for further execution on the host machine if the one or more interrupts of the second process are masked, and
    if the one or more interrupts of the second process are not masked:
        mapping access to a host machine resource to a file system of the first process,
        scheduling the first process for further execution on the host machine, and
        remapping resource access to the second process.

14. The method of claim 13, wherein the monitor process is a virtual machine monitor.

15. The method of claim 13, the first process and the second process are guest processes to run on said host machine.

16. The method of claim 13, further comprising:

performing a file system integrity validation on the host machine when access to the host machine resource is mapped to the file system of the first process.

17. The method of claim 16, further including analyzing the file system.

18. The method of claim 16, wherein performing the file system integrity check occurs independently of booting the host machine.

19. The method of claim 13, wherein mapping resource access to the first process includes mounting a file system of the second process on the file system of the first process.

20. The method of claim 13, wherein the event causing an exit into the monitor process places said second process in a suspended state.

21. The method of claim 13, further comprising:

incrementing a counter if the second process traps an event to an exit into the monitor process and the predetermined amount of time has not elapsed, and resetting a counter if the second process traps an event that causes an exit into the monitor process and the predetermined amount of time has elapsed.

22. The method of claim 16, modifying restrictions and hardware behavior based on the file system integrity validation.

23. The method of claim 13, said resource is one of input/output and memory.

24. A machine-storage medium containing instructions that, when executed, cause a machine to:

execute a first process and a second process on a host machine;

detect that a predetermined amount of time has elapsed after the second process traps an event that causes an exit of the second process into a monitor process;

determine whether one or more interrupts of the second process are masked;

schedule the first process and the second process for further execution on the host machine if the one or more interrupts of the second process are masked, and if the one or more interrupts of the second process are not masked:

map access to a host machine resource to a file system of the first process, schedule the first process for further execution on the host machine, and remap resource access to the second process.

25. The machine-storage medium of claim 24, comprising further instructions to:

perform a file system integrity validation on the host machine when access to the host machine resource is mapped to the file system of the first process.

26. The machine-storage medium of claim 25, comprising further instructions to analyze the file system.

27. The machine-storage medium of claim 25, wherein performing the file system integrity check occurs independently of booting the host machine.

28. The machine-storage medium of claim 26, wherein the instructions to map resource access to the first process include further instructions that cause a machine to mount a file system of the second process on the file system of the first process.

29. The machine-storage medium of claim 24, comprising further instructions to:

increment a counter if the second process traps an event to an exit into the monitor process and the predetermined amount of time has not elapsed, and reset a counter if the second process traps an event that causes an exit into the monitor process and the predetermined amount of time has elapsed.

30. The machine-storage medium of claim 25, further comprising instructions to modify restrictions and hardware behavior based on the file system integrity validation.

* * * * *